(12) United States Patent
Lyons

(10) Patent No.: US 6,566,467 B1
(45) Date of Patent: May 20, 2003

(54) INHIBITOR COMPOSITION FOR CHLOROPRENE POLYMERIZATION

(76) Inventor: Donald Frederick Lyons, 2503 Teal Rd., Wilmington, DE (US) 19805

( * ) Notice: Subject to any disclaimer, the term of this patent is extended or adjusted under 35 U.S.C. 154(b) by 0 days.

(21) Appl. No.: 09/234,736

(22) Filed: Jan. 21, 1999

Related U.S. Application Data

(60) Provisional application No. 60/072,218, filed on Jan. 22, 1998.

(51) Int. Cl.[7] .............................. C08F 2/00; C09K 3/00
(52) U.S. Cl. .................................. 526/210; 252/182.13
(58) Field of Search ......................................... 526/210

(56) References Cited

U.S. PATENT DOCUMENTS

| | | | |
|---|---|---|---|
| 2,187,146 A | 1/1940 | Calcott et al. .................. | 18/57 |
| 2,264,173 A | 11/1941 | Collins ........................ | 260/32 |
| 2,264,191 A | 11/1941 | Starkweather et al. ........ | 260/32 |
| 2,467,769 A | 4/1949 | Morrow et al. ............... | 202/47 |
| 3,074,899 A | 1/1963 | Rosahl et al. ............... | 260/29.7 |
| 3,849,372 A | * 11/1974 | Finley .................. | 260/49.95 R |
| 4,481,313 A | 11/1984 | Banta et al. .................. | 524/84 |

FOREIGN PATENT DOCUMENTS

| | | | |
|---|---|---|---|
| CN | 86103840 | * | 5/1986 |
| CS | 164376 | * | 1/1975 |
| EP | 0842999 A1 | * | 5/1998 |
| JP | 52-100419 | | 8/1977 |

OTHER PUBLICATIONS

Gevorkyan et.al. Vysokomol Soedin.., Ser. A (1976), 18(6), 1247–52.*

* cited by examiner

*Primary Examiner*—Michael J. Carone
*Assistant Examiner*—Aileen J. Baker

(57) ABSTRACT

Polymerization inhibitor compositions for the emulsion polymerization of chloroprene comprise a 4-(lower alkoxy) phenol and a hindered bis(phenol)methane in a molar ratio in the range of 0.5/1–2.5/1. Discoloration resistant polychloroprene rubbers are produced.

10 Claims, No Drawings

INHIBITOR COMPOSITION FOR CHLOROPRENE POLYMERIZATION

REFERENCE TO RELATED APPLICATION

This application claims the benefit of U.S. Provisional Application No. 60/072,218 filed Jan. 22, 1998.

BACKGROUND OF THE INVENTION

1. Field of the Invention

This invention relates to an inhibitor for the emulsion polymerization of chloroprene and a process for making a discoloration-resistant polychloroprene using such inhibitor.

2. Background Art

Chloroprene is a highly reactive monomer. Spontaneous free-radical polymerization is expected for uninhibited chloroprene monomer at ordinary temperatures (Encyclopedia of Polymer Science and Engineering, Volume 3, second edition, p. 442 (1985)).

Emulsion polymerization is the preferred way to accommodate the high polymerization rates of chloroprene and achieve high molecular weight. In order to control the polymerization reaction and prevent additional reactions after the desired molecular weight is reached, the polymerization reaction is usually not taken to full conversion of the chloroprene monomer. Rather, the reaction mixture is treated with an inhibitor, often referred to as a shortstop, which effectively stops the polymerization at less than 100% conversion. The residual chloroprene monomer is then removed.

Known effective shortstops for the emulsion polymerization of chloroprene such as phenothiazine and para-tert-butyl catechol, are usually highly colored or photosensitizers. They lead to polychloroprenes which discolor quickly under sunlight. Other materials disclosed as a shortstop or stabilizer for the emulsion polymerization of chloroprene include a class of bis(phenol)methane compounds which are substituted with alkyl radicals in the positions ortho and para to each of the hydroxy groups (the "Rosahl compounds"), which are disclosed by Rosahl et al. in U.S. Pat. No. 3,074,899. While the "Rosahl" compounds do yield polymers with a low tendency to discolor, Applicant has found that they do not safely and effectively shortstop chloroprene polymerization when the "Rosahl" compounds are used as the sole inhibitor. Further in U.S. Pat. No. 4,481,313, Banta et al. disclose that the emulsion polymerization of chloroprene can be shortstopped using phenolic antioxidants such as hydroquinone, 2,5-di-tert-amylhydroquinone, 4-tert-butyl-pyrocatechol, 4,4'-thiobis(6-tert-butyl-o-cresol) and 2,6-di-tert-butyl-4-phenylphenol. The phenolic antioxidants disclosed in U.S. Pat. No. 4,481,313 either cause discoloration or have been found by Applicant to be ineffective shortstops.

SUMMARY OF THE INVENTION

The invention is directed to a polymerization inhibitor composition for the emulsion polymerization of chloroprene comprising a 4-($C_1$–$C_3$ alkoxy)phenol and a hindered bis(phenol)methane of the formula

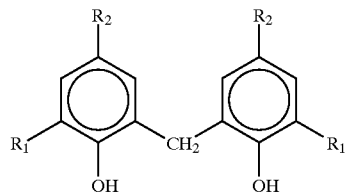

wherein each $R^1$ is independently selected from the group consisting of $C_1$–$C_{12}$ alkyl radicals and each $R^2$ is independently selected from the group consisting of H and $C_1$–$C_{12}$ alkyl radicals, the molar ratio of the alkoxyphenol to the hindered bis(phenol)methane being 0.5/1–2.5/1.

Further, the invention is directed to a process for making a discoloration-resistant polychloroprene comprising the steps of polymerizing chloroprene monomer in an aqueous emulsion and shortstopping the polymerization step by adding the above inhibitor composition. A minimum of 0.0003% of the total of alkoxyphenol and bis(phenol) methane are required for an effective shortstop, based on the weight of total initial monomer in the polymerization process.

DETAILED DESCRIPTION OF THE INVENTION

Applicant has found that 4-($C_1$–$C_3$ alkoxy)phenol compounds (sometimes referred to as hydroquinone mono ($C_1$–$C_3$ alkyl)ether compounds) are about as effective as the Rosahl compounds for shortstopping the emulsion polymerization of chloroprene and that neither completely halts polymerization when used as the sole inhibitor. More importantly, Applicant has further discovered that a composition containing both types of compounds is a surprisingly more effective shortstop than either one alone and the combination can completely halt polymerization.

Emulsion polymerization of chloroprene is well known. It is used conventionally to produce a variety of chloroprene rubbers. The term "polymers of chloroprene" or "chloroprene rubbers" encompasses polymers in which chloroprene is the major or predominant monomer and include chloroprene dipolymers, terpolymers and higher copolymers. Organic comonomers such as 2,3-dichloro-1,3-butadiene; acrylonitrile, methacrylonitrile, lower alkyl acrylates, lower alkyl methacrylates, acrylamides, methacrylamides, lower alkyl maleates and fumarates, acrylic acid, methacrylic acid, fumaric acid and maleic acid may be employed.

Usually, the total amount of comonomers will represent no greater than 25 mole percent of the total monomers and preferably will constitute less than 15 mole percent of the total monomers including chloroprene. The term "monomer" as used is understood to include all polymerizable monomer excluding any elemental sulfur that may be incorporated into the polymer. The total amount of monomers is generally at least 50 mole percent chloroprene, preferably less than 25 mole percent comonomer and more preferably less than 15 mole percent comonomer.

Any process for polymerizing chloroprene in aqueous emulsion which does not interfere with the novel characteristics of this invention can be employed. Processes and methods for the polymerization and recovery of chloroprene are disclosed, for example, in the "Encyclopedia of Polymer Science and Technology," supra, and in numerous patents such as U.S. Pat. Nos. 2,264,173 and 2,264,191 both issued on Nov. 25, 1941 and Whitby, "Synthetic Rubber", 1954, p. 770. The polymerization may be conducted either batchwise or continuously.

A typical process begins with a recipe which calls for an emulsifier, water, chloroprene, comonomer as appropriate, either elemental sulfur or a chain-transfer agent, and other additives for colloidal stability.

Conventional emulsifiers may be employed such as the salts of rosins and rosin derivatives such as tall oil rosin (or resin), wood rosin, disproportionated rosins and salts thereof. Rosin base emulsifiers are well known to the art. A particularly preferred rosin emulsifier is wood rosin (unmodified except for clean-up and sold by the Reichhold Chemicals as Nancy-Wood Rosin).

In general practice, chloroprene is polymerized in the presence of either elemental sulfur or a sulfur-containing chain-transfer agent. Elemental sulfur is incorporated into the backbone of the polymer. Polysulfide bonds are subsequently cleaved by a peptizing agent. The amount of sulfur can range from as low as 0.1% or less based on polymerizable compounds (monomer) up to the maximum proportion soluble in the non-aqueous phase under the conditions of the polymerization, ordinarily about 0.2 to 2.5%, preferably in the range of 0.2 to 0.8 parts of sulfur per 100 parts of monomer, more preferably 0.3 to 0.65 parts thereof.

In contrast to elemental sulfur, chain transfer agents react with growing polymer chain ends resulting in termination and end-capping. Conventional chain-transfer agents include mercaptans such as dodecyl mercaptan and disulfides such as alkylxanthogen disulfides. Generally, at least 0.05 parts, preferably 0.05–0.8 parts and most preferably 0.1–0.25 parts, chain transfer agent are used per 100 parts monomer.

The usual methods may be employed to prepare the aqueous emulsion of monomers, either elemental sulfur or chain-transfer agent, emulsifier and water. A stabilizer for the emulsion, such as a sodium salt of a naphthalensulfonic acid-formaldehyde condensation product is generally added to the aqueous phase as well. The proportions in the aqueous emulsion are not critical but generally the monomer will be present in an amount such as from 30 to 60 percent by weight based on the total weight of the composition.

The pH of the aqueous emulsion for polymerization may be varied depending upon the particular emulsification system employed and can be acidic, neutral or alkaline; however, it is preferred to have a pH in the range of about 7 to 13.5.

An initiator is added to the emulsion. Conventional initiators for chloroprene polymerization may be employed. Preferred initiators are water-soluble peroxide initiators of the organic or inorganic type. Examples of organic peroxides are benzoyl peroxide, cumene hydroperoxide, tertiary-butyl isopropylbenzene hydroperoxide, azo catalysts such as alpha-alpha-azo-bis-isobutyronitrile and the like. Suitable inorganic peroxides are salts of inorganic per acids including persulfates, perborates or percarbonates, e.g., ammonium or potassium persulfate and hydrogen peroxide. A solution of potassium persulfate and sodium 2-anthraquinone sulfonate is most preferred. The initiator may be used in amounts required to bring about polymerization at any desired rate with suitable ranges being from 0.001 to 0.5 parts by weight per 100 parts of polymerizable monomer.

The reaction progress is monitored, usually by gas-chromatographic analysis of unreacted chloroprene or by following the specific gravity change as a result of polymerization. Normally, the polymerization is stopped at less than complete conversion of all the chloroprene monomer. When reaching the conversion goal, polymerization is stopped by adding a minimum of 0.0003%, based on the weight of total starting monomer (chloroprene plus comonomers) in the polymerization, of the inhibitor composition of the invention, which comprises a 4-($C_1$–$C_3$ alkoxy)phenol and a hindered bis(phenol)methane of the formula

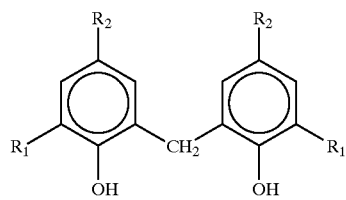

wherein each $R^1$ is independently selected from the group consisting of $C_1$–$C_{12}$ alkyl radicals and each $R^2$ is independently selected from the group consisting of H and $C_1$–$C_{12}$ alkyl radicals. The alkyl radicals may be straight-chain, branched or cyclic. Each $R^1$ is preferably a $C_3$–$C_{12}$ branched alkyl or cycloalkyl radical, more preferably a $C_3$–$C_{12}$ branched alkyl radical. Each $R^2$ is preferably a $C_1$–$C_{12}$ alkyl radical, more preferably a $C_1$–$C_6$ alkyl radical. The most preferred hindered bis(phenol)methane compounds are 2,2'-methylene-bis-(6-tert-butyl-4-methylphenol) and 2,2'-methylene-bis-(6-tert-butyl-4-ethylphenol). The preferred alkoxyphenol is 4-methoxyphenol. The molar ratio of the alkoxyphenol to the bis(phenol)methane in the inhibitor composition is in the range of 0.5/1–2.5/1, preferably 0.75/1–2.0/1.

If elemental sulfur has been included in the polymerization, the polymer is then broken down by peptization, in which the polysulfide bonds are cleaved. Conventional peptizing agents such as tetraalkyl thiuram disulfides may be employed.

Unreacted monomer is then stripped off, for example, using steam in a turbannular flow as well know in the art as described in U.S. Pat. No. 2,467,769. Typically the stripped latex is acidified and may either be stored in that form or the chloroprene rubber isolated, for example, by continuously coagulating it as a polymer film on a freeze roll as known in the art and described in U.S. Pat. No. 2,187,146. The resultant polymer film is washed and dried and resistant to discoloration.

Chloroprene rubbers made according to this invention can be used in any typical chloroprene rubber application. They are particularly useful in adhesive compositions such as solution adhesives and graft adhesives. In the solution adhesives, chloroprene polymer is dissolved in an organic solvent and blended with tackifiers, antioxidants and metal oxides. In the graft adhesives, chloroprene polymer is dissolved in an organic solvent and grafted with methyl methacrylate. The resulting graft polymer (in solution) is blended with tackifiers and antioxidants.

The following examples are presented to illustrate the invention and are not intended to limit the scope thereof. In the examples parts and percents are by weight unless otherwise specified. The parts by weight in the specification and claims are based on original monomer present in the polymerization unless specified otherwise.

EXAMPLES

Test Method

A solution of 2000 g CD (chloroprene monomer), 60 g disproportionated rosin, and 4.4 g n-dodecyl mercaptan was emulsified with a solution of 1720.5 g demineralized water, 9.5 g NaOH (100%), 3.0 g sodium sulfite, and 8.0 g sulfonated naphthalene-formaldehyde condensation product. The emulsion was brought to a temperature of 40° C. and an initiator solution of 0.005% potassium persulfate and 0.000125% sodium 2-anthraquinone sulfonate was added. Initiator solution was added until the specific gravity of the emulsion reached 1.062. Between 15 and 50 grams of initiator solution was required to reach this specific gravity. At this point the desired shortstop was added. A sample of emulsion was withdrawn and its solid content measured as a weight percentage of the emulsion.

5 grams of a second initiator solution of 0.05% potassium persulfate and 0.00125% sodium 2-anthraquinone sulfonate was added and the emulsion temperature was maintained at 40° C. for one hour. Then another sample was withdrawn for solids content measurement.

The solids content of the first sample was subtracted from the solids content of the second sample to determine the extent of conversion drift (i.e., the extent to which the amount of reacted monomer changed between measurements). A smaller conversion drift value indicates a more effective shortstop; maximum effectiveness for a short topping composition is indicated by 0.0 conversion drift (i.e. no additional conversion of monomer to polymer in the period between measurements). A maximum conversion draft value of 0.2 is required for safe and effective short-stopping ability.

Example 1

A shortstop emulsion was prepared by mixing together 47.0 grams toluene, 3.0 grams (8.8×10-3 moles) 2,2'-methylene-bis(6-tert-butyl-4-methylphenol), 47.0 grams demineralized water, 1.0 grams (8.0×10-3 moles) 4-methoxyphenol, and 2.0 grams of Duponol WAQE, a 30% solution of sodium lauryl sulfate, (Witco Corporation, Greenwich, Conn.). This represents an alkoxyphenol:hindered bis(phenol)methane molar ratio of 0.9:1. 32.0 grams of this shortstop emulsion was used as shortstop for the test recipe. The difference in solids content was 0.0.

Example 2

A shortstop emulsion was prepared by mixing together 46.5 grams toluene, 3.0 grams (8.8×10-3 moles) 2,2'-methylene-bis(6-tert-butyl-4-methylphenol), 46.5 grams demineralized water, 2.0 grams (1.6×10-2 moles) 4-methoxyphenol, and 2.0 grams Duponol WAQE. This represents an alkoxyphenol:hindered bis(phenol)methane molar ratio of 1.8:1. 32.0 grams of this shortstop emulsion was used as shortstop for the test recipe. The difference in solids content was 0.0.

Example 3

A shortstop emulsion was prepared as in Example 1. 15.0 grams of this shortstop emulsion was used as shortstop for the test recipe. The difference in solids content was 0.10.

Comparative Example 1

A shortstop emulsion was prepared by mixing together 46.0 grams toluene, 3.0 grams (8.8×10-3 moles) 2,2'-methylene-bis(6-tert-butyl-4-methylphenol), 46.0 grams demineralized water, 3.0 grams (2.4×10-2 moles) 4-methoxyphenol, and 2.0 grams Duponol WAQE. This represents an alkoxyphenol:hindered bis(phenol)methane molar ratio of 2.7:1. 32.0 grams of this shortstop emulsion was used as shortstop for the test recipe. The difference in solids content was 0.4. This demonstrates operation outside the preferred molar ratio of alkoxyphenol to bis(phenol) methane.

Comparative Example 2

A shortstop emulsion was prepared by mixing together 48.0 grams toluene, 3.0 grams 2,2'-methylene-bis(6-tert-butyl-4-methylphenol), 48.0 grams demineralized water, and 1.0 grams Duponol WAQE. 14.0 grams of this shortstop emulsion was used as shortstop for the test recipe. The difference in solids content was 4.1. This demonstrates operation with hindered bis(phenol)methane alone.

Comparative Example 3

A shortstop emulsion was prepared by mixing together 48.0 grams toluene, 48.0 grams demineralized water, 3.0 grams 4-methoxyphenol and 1.0 grams Duponol WAQE. 14.0 grams of this shortstop emulsion was used as shortstop for the test recipe. The difference in solids content was 3.9. This demonstrates operation with alkoxyphenol alone.

What is claimed is:

1. A polymerization inhibitor composition for the emulsion polymerization of chloroprene comprising a 4-($C_1$–$C_3$ alkoxy)phenol and a hindered bis(phenol)methane of the formula

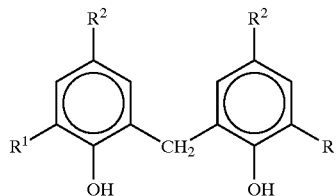

wherein each $R^1$ is independently selected from the group consisting of $C_1$–$C_{12}$ alkyl radicals and each $R^2$ is independently selected from the group consisting of H and $C_1$–$C_{12}$ alkyl radicals, the molar ratio of the alkoxyphenol to the hindered bis(phenol)methane being in the range of 0.5/1–2.5/1.

2. The composition of claim 1 wherein the 4-($C_1$–$C_3$ alkoxy)phenol is 4-methoxyphenol.

3. The composition of claim 2 wherein each $R^1$ is independently selected from the group consisting of $C_3$–$C_{12}$ branched alkyl and cycloalkyl radicals.

4. The composition of claim 3 wherein the bis(phenol) methane is 2,2'-methylene-bis(6-tert-butyl-4-methylphenol).

5. The composition of claim 3 wherein the bis(phenol) methane is 2,2'-methylene-bis(6-tert-butyl-4-ethylphenol).

6. A process for preparing a discoloration-resistant polychloroprene comprising the steps of polymerizing chloroprene monomer in an aqueous emulsion and inhibiting the polymerization step by adding at least 0.0003%, based on the weight of total starting monomer, of a polymerization inhibitor composition comprising a 4-($C_1$–$C_3$alkoxy)phenol and a hindered bis(phenol)methane of the formula

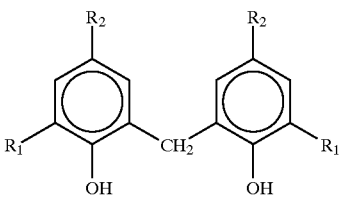

wherein each $R^1$ is independently selected from the group consisting of $C_1$–$C_{12}$ alkyl radicals and each $R^2$ is independently selected from the group consisting of H and $C_1$–$C_{12}$ alkyl radicals, the molar ratio of the alkoxyphenol to the hindered (bisphenol)methane being in the range of 0.5/1–2.5/1.

7. The process of claim 6 wherein the 4-($C_1$–$C_3$ alkoxy) phenol is 4-methoxyphenol.

8. The process of claim 6 wherein each $R^1$ of the hindered bis(phenol)methane is independently selected form the group consisting of $C_3$–$C_{12}$ branched alkyl and cycloalkyl radicals.

9. The process of claim 8 wherein the hindered bis (phenol)methane is 2,2'-methylene-bis(6-tert-butyl-4-methylphenol).

10. The composition of claim 8 wherein the hindered bis(phenol)methane is 2,2'-methylene-bis(6-tert-butyl-4-ethylphenol).

* * * * *